Figure 3:
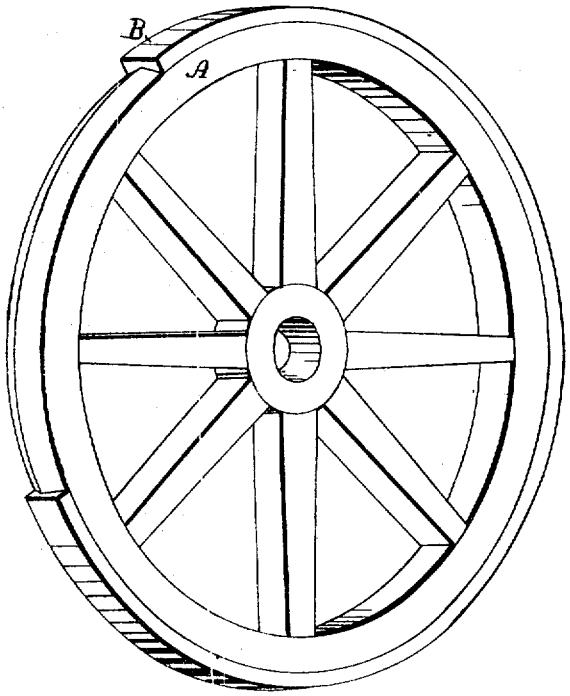
Figure 1:
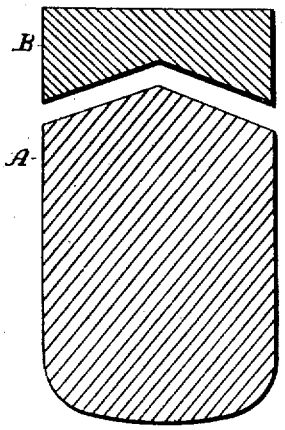
Figure 4:
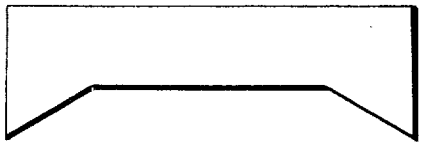
Figure 2:
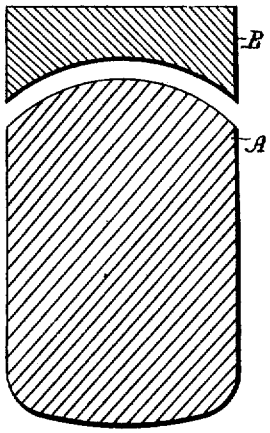

9411X

J. H. Rogers
Tire.

No. Patented Feb. 17. 1836.

9411 X Feb. 17. 1836 [illegible] 193

James H. Rogers. of Mount Morris. New York.

Letters Patent.

The schedule referred to in these Letters Patent and making part of the same containing a description in the words of the said James H. Rogers himself of his improvement in the hollowed or grooved tire for carriage and other wheels.

+ To all to whom these presents shall come,

Be it known that I James H. Rogers of Mount Morris in the County of Livingston and State of New York, have invented a new and useful improvement in the manufacture of Iron tire for wheels and that the following is a full and exact description thereof, being an oblique angular or circular groove or hollow on the inside of the tire to be matched with the outer extremity of the felloe fitted thereto, thus holding the fellees in their proper place and in all respects rendering the wheel more substantial and better calculated for service than in the ordinary mode of construc-ting it can be made,

What I claim as my own invention and not previously known in the above described Machine, is the use and application of the hollowed or grooved tire for the purpose of carriage and other wheel building generally —

Witnesses
Albertus D. Childs
Charles Hinman

James H. Rogers (Patented 17 Feby 1836) Drawing

[illegible]